Dec. 19, 1961   G. WINTER ET AL   3,014,167
HIGH VOLTAGE CONDENSER FOR IMPULSE DISCHARGES
Filed March 3, 1959   2 Sheets-Sheet 1

INVENTORS
Gerhard Winter
Erwin Munk
Hermann Sträb by: Michael S. Striker
Attorney Dec. 19, 1961 G. WINTER ET AL 3,014,167
HIGH VOLTAGE CONDENSER FOR IMPULSE DISCHARGES
Filed March 3, 1959 2 Sheets-Sheet 2

INVENTOR.
Gerhard Winter
Erwin Musik
BY Hermann Strüb

Richard S. Striker
Atty

United States Patent Office 3,014,167
Patented Dec. 19, 1961

3,014,167
HIGH VOLTAGE CONDENSER FOR IMPULSE DISCHARGES
Gerhard Winter, Stuttgart-Frauenkopf, Erwin Munk, Esslingen, and Hermann Sträb, Sillenbuch, Germany, assignors to Robert Bosch G.m.b.H., Stuttgart, Germany
Filed Mar. 3, 1959, Ser. No. 796,902
Claims priority, application Germany Mar. 4, 1958
9 Claims. (Cl. 317—260)

The present invention concerns high voltage condensers, and more particularly high voltage condensers for impulse discharges.

There is a particular interest for condensers of the type set forth which are operating at a voltage of at least 25 kv. and which have a capacity of at least .5 $\mu$f. Condensers of this type must be capable to deliver, for the purpose of impulse discharges, current impulses of very great intensity for a brief period of time. The condition for this capability of the condensers is a low inductivity and low ohmic resistance.

Condensers of conventional type, having conductive layers consisting of metal foils, are not suited for meeting the above stated conditions satisfactorily because all condensers constructed with foil layers can only be used with fields of comparatively small strength if it is intended to avoid safely breakdowns which, on account of the very large turnover of energy, might easily cause explosion-like destructions.

It is therefore a main object of this invention to provide for a high voltage condenser for impulse discharges which would satisfactorily meet the above mentioned conditions and requirements.

With above object in view, a high voltage condenser according to the invention capable of handling voltages of at least 25 kv. and having a capacity of at least .5 $\mu$f. comprises low inductivity, self-healing type roll-construction capacitor means dimensioned in such a manner that the resonance frequency of the condenser is at least 1 mc. It can be seen that the resonance frequency is a function, and therefore, a measure of the self-inductivity of the condenser, and it is the higher the smaller is the self-inductivity. In view of the fact that the capacitor means are of the self-healing type having very thin metallic layers that may burn out in spots, a condenser as provided by the invention can be subjected to fields of a strength 20–50% stronger than those which are applicable to condensers having plain metal foil layers. All considered, a self-healing condenser of the type described has, for a given capacity and operating voltage, a considerably smaller volume and a substantially smaller inductivity than a corresponding regular foil type condenser. Mechanical destructions are not to be expected because in the process of "self-healing" only small amounts of energy are turned over.

More particularly, a condenser of the type set forth comprises, according to the invention, in combination, a plurality of self-healing type roll-construction capacitors connected in series with each other; an input terminal connected to the input end of the first of said plurality of capacitors; an output terminal connected to the output end of the last one of said plurality of capacitors; and a housing of conductive material surrounding said plurality of capacitors and insulated therefrom, said output terminal being connected to said housing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which: FIG. 1 shows a preferred embodiment of a condenser according to the invention in longitudinal cross section;

Figure 1:
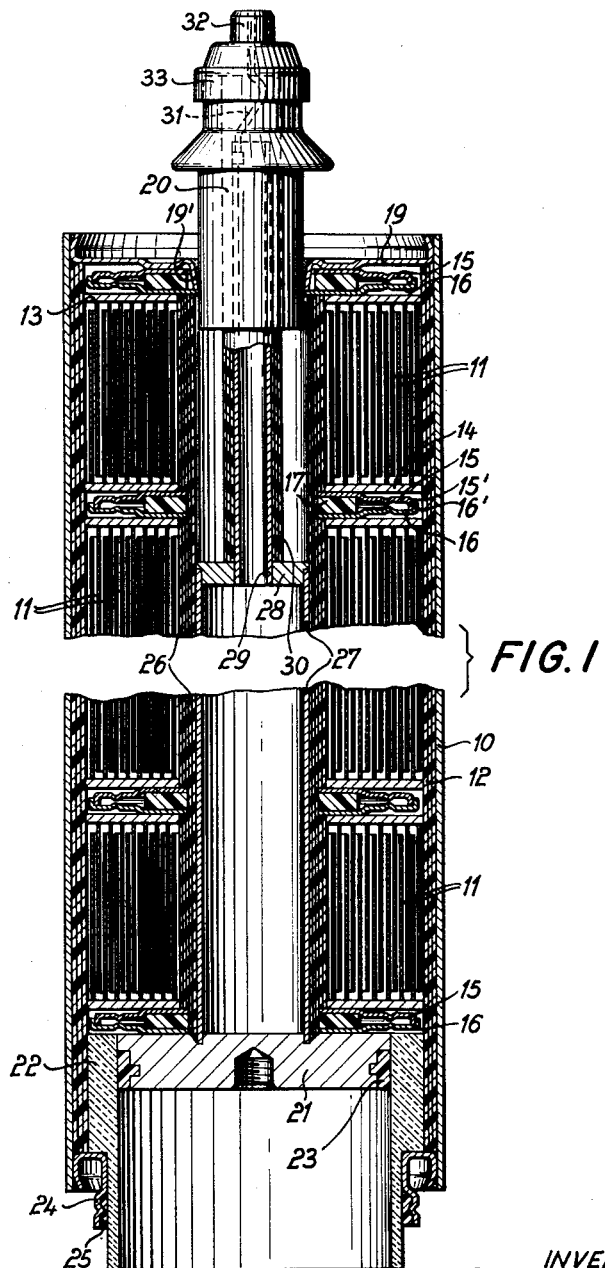

A condenser as illustrated is particularly suitable for being used in connection with producing reactions in the field of nuclear physics.

The condenser as illustrated is an assembly contained by a tubular housing 10 made of brass. Arranged inside the housing 10 are five capacitor elements 11, coaxially aligned with each other and connected in series with each other, each individual capacitor element 11 being designed for 5 kv. operating voltage. Each capacitor 11 is of the self-healing, roll-construction type made up of coils of metallized paper. The overall diameter of the roll of metallized paper constituting the capacitor is greater than its axial length. Each capacitor is formed with a central cylindrical cavity so dimensioned that the outer diameter is by no means more than 2.5 times the size of the inner diameter of the central tubular cavity. In view of the just mentioned two dimensional limitations, the inductivity of the capacitor is kept as small as possible. The surrounding housing 10 is separated from the series of capacitors 11 by at least three layers 12 of a thin, elastic synthetic foil of high breakdown strength. In the assumed case of an operating voltage of 25 kv. in toto applied to the condenser, it is amply sufficient if the insulating layer 12 between the housing 10 and the capacitors 11 consists of cellulose triacetate material provided in a layer thickness totalling not more than one millimeter.

The individual conductive layers of each capacitor 11 extend alternatingly to one and the other end face, respectively, of the particular capacitor. There each set of layers is connected in parallel by a contact bridge member 13 and 14, respectively, which covers substantially the whole end face of the capacitor and is preferably applied by spraying.

For the purpose of connecting all the capacitors 11 in series with each other, disc members 15 and 16, respectively, are attached by soldering to the respective contact bridge members 13 and 14. In order to facilitate and to improve this soldering connection, the disc members 15 and 16 are preferably provided with at least one perforation through which the solder can be suitably applied to the contacting surfaces of the particular adjoining bridge and disc members, said perforation or perforations being filled with solder.

Each of the disc members 15 and 16 are formed with a peripheral rim projecting in direction away from the adjoining bridge member, the arrangement being such that the outer diameter of the rim 15' of the disc 15 is not larger than the inner diameter of the rim 16' of the disc 16 so that when the disc 15 attached to one end of one capacitor is fitted telescopingly into the rim 16' of the disc 16 attached to the opposite end of the next consecutive capacitor, the adjoining discs 15 and 16 can be permanently connected with each other by soldering in the area where the rims 15' and 16' engage each other. In this manner, the capacitors 11 are connected to each other in series along the large surface areas along said rims of the discs and at low inductivity.

In order to protect the contact bridges 13, 14, against mechanical damage through the very substantial electromagnetic forces developing in the case of impulse discharges, the discs 15, 16 are formed and made of resiliently yielding material for being able to yield elastically in the axial direction of the condenser. Moreover, each disc 15, 16 is formed with an annular recess so that between these recesses of adjoining discs an annular space is formed into which a ring of elastic material 17 is placed for dampening any elastic movements of adjoining discs.

The sheet metal disc 16 of the topmost capacitor 11 is also connected, in the manner set forth, with a disc 15 which latter is connected along an annular zone with a lid 19. The lid 19 is provided with an outwardly projecting outer rim which is connected by soldering to the upper edge of the housing tube 10. In this manner, one set of conductive layers of the topmost capacitor 11 is conductively connected with the housing 10. The inner rim 19' of the lid 19 forms an opening through which an insulator 20 is inserted so that it partly projects into the previously mentioned central cavity of the topmost capacitor 11, while projecting with its free end in axial direction from the whole assembly. Preferably, the shank of the insulator 20 is metallized in the area where it penetrates through the opening formed by the rim 19'. Therefore, this rim 19' can be attached by soldering to the metallized portion of the insulator 20.

The set of layers extending to the lower end face of the lowermost capacitor 11 is connected in the manner described above to the respective disc 15, and a disc 16 is likewise connected by soldering to that disc 15. In turn, the lowermost metal disc 16 is attached to a large metal disc 21 which is located within the lower end of the housing 10 but separated therefrom by a tubular member 22 made of insulating material, said member 22 also serving to hold the plate 21 in centered position in the housing 10.

A mounting ring 24 is soldered into the lower end of the housing 10 and the provided spaces between the disc 21 and the tube 22 as well as between the ring 24 and the tube 22 are filled with fusible resin material as shown at 23 and 25. In this manner, the whole assembly is safely closed also at its lower end.

In the condenser shown in the drawing, the disc 21 may serve as the discharging electrode. On the other hand, the condenser may be charged from its upper end by means of the connections 27, 28, 29, 31, 32, and 33.

In particular, a thin wall tubing 27 is inserted into the coaxial cavities within the various capacitors 11, several layers 26 of cellulose triacetate foil material being interposed as an insulator between the outer wall of the tubing 27 and the inner walls of the capacitors 11. The lower end of the tubing 27 is attached, by being soldered into a groove, to the disc 21. The tubing 27 extends approximately to the upper end of the fourth capacitor 11 as counted from the lower end of the stack. The upper end of the tubing 27 is press-fitted on a shoulder of a contact ring 28 which has a central bore into which a tubular conductor 29 is press-fitted. This conductor 29 is surrounded by insulating foil material 30 and ends inside the insulator 20 as shown. A metal strip 31 connects the upper end of the conductor 29 with a threaded portion 32 of a terminal cap 33 mounted on the free end of the insulator 20. Since the electrode arranged inside the condenser coaxially with the capacitor elements 11 has a very minute inductivity, this electrode can be used without disadvantage also for connecting a plurality of condensers in parallel.

The condenser as shown and described by way of example having five series-connected capacitor elements 11, is designed for a nominal capacity of .5 µf. and for an operating voltage of 25 kv. so that its energy content would be 156.5 w. On account of the chosen dimensions and the characteristic structural arrangement, the self-inductivity would be .029 µh. which results in a resonance frequency of 1.33 mc.

It is of great value to use for all metal components only other than ferro-magnetic materials.

It has been found in practical use of the condenser described above that during the discharge thereof the strength of the discharge current exceeds $10^6$ amps. Nevertheless, any breakdowns during operation were overcome by "self-healing" without any trouble. The danger of destruction of the condenser by the energy freed during the self-healing breakdowns has been eliminated by the fact that in the individual capacitor elements the metallic layers which are permitted to burn out are subdivided into elongated portions spaced from each other and having e.g. a width of 20–30 mm. In order to prevent the metallic layers of the capacitors from being separated, in the case of self-healing breakdowns, from the contact bridges 13, 14, the thickness of said layers is provided so as to gradually increase from a minimum dimension inside the capacitor to a maximum thickness at their ends where they are connected to the contact bridges.

Figure 2:
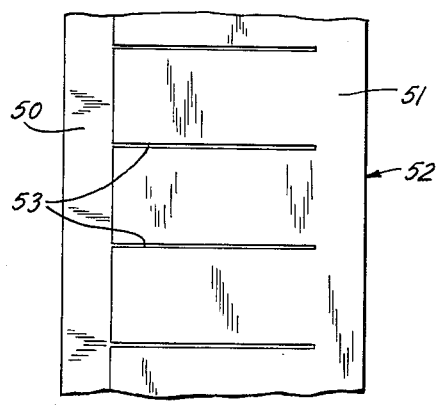
FIG. 2 is a partial plan view of component condenser material.
Figure 3:
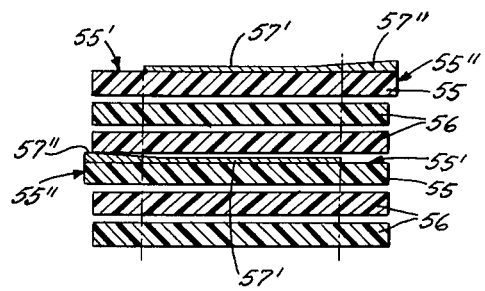
FIG. 3 is, at exaggerated scale, a diagrammatic cross-section of several layers of the condenser material.

The above mentioned structure will be better understood by referring to FIGS. 2 and 3. As can be seen from FIG. 2, a dielectric layer 50 is provided over the greatest part of its width with a metallic layer 51 constituting a continuous strip of conductive material along the edge 52 while being subdivided by slots 53 into elongated portions spaced from each other by the slots. FIG. 3 shows diagrammatically in exaggerated magnification several layers of a coiled condenser. As can be seen, in this structure two dielectric layers 55 carrying each a metallic layer 57' are separated by dielectric layers 56 carrying no metal layer. Of course the spacing between the individual layers is non-existent in the structure and only shown in the drawing for the sake of clarity. The metallic layers 57' are applied to one surface of the respective layer 55 only over a part of the width of the latter so that a metal-free margin 55' is left, while along the opposite edge 55" the metal layer 57' extends up to this edge. However the portion of the metal layer in the marginal area along the edge 55" is substantially increased in thickness as shown at 57". This facilitates the connection between the edges of these layers with the sprayed contact bridges mentioned in the specification. For all practical purposes the capacitive zone of the condenser coils extends only between the dash-dotted vertical lines that can be seen in FIG. 3.

It will be understood that each of the elements described above, or two or more together, may also find a useful application in other types of high voltage condensers differing from the types described above.

While the invention has been illustrated and described as embodied in high voltage condensers for impulse discharge, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. High voltage condenser for impulse discharge, comprising, in combination, a plurality of self-healing type roll-construction capacitors arranged in coaxial alignment with each other, each of said capacitors being substantially cylindrical with a coaxial central cylindrical cavity, said outer diameter being less than 2.5 times the size of the inner diameter of said cavity; resiliently yielding conductive spacer means interposed between and series-connecting said capacitors; an input terminal connected to the input end of the first of said plurality of capacitors; an output terminal connected to the output end of the last one of said plurality of capacitors; and a housing of conductive material surrounding said plurality of capacitors and insulated therefrom, said output terminal being connected to said housing.

2. High voltage condenser for impulse discharge, comprising, in combination, a plurality of self-healing type roll-construction capacitors arranged in coaxial alignment with each other, each of said capacitors being substantially cylindrical with a coaxial central cylindrical cavity, said outer diameter being less than 2.5 times the size of the inner diameter of said cavity, each of said capacitors comprising a first and a second set of conductive layers separated by layers of dielectric material, said first set of layers having end portions ending in axial direction at one end face of the capacitor, said second set of layers having end portions ending in axial direction at the other end face of the capacitor, said end portions of consecutive capacitors facing each other being permanently connected conductively with each other; resiliently yielding conductive spacer means interposed between and series-connecting said capacitors; an input terminal connected to the input end of the first of said plurality of capacitors; an output terminal connected to the output end of the last one of said plurality of capacitors; and a housing of conductive material surrounding said plurality of capacitors and insulated therefrom, said output terminal being connected to said housing.

3. High voltage condenser for impulse discharge, comprising, in combination, a plurality of self-healing type roll-construction capacitors, each of said capacitors being substantially cylindrical with a coaxial central cylindrical cavity, said outer diameter being less than 2.5 times the size of the inner diameter of said cavity, each of said capacitors comprising a first and a second set of conductive layers separated by layers of dielectric material, said first set of layers having end portions ending in axial direction at one end face of the capacitor, said second set of layers having end portions ending in axial direction at the other end face of the capacitor, contact bridge members formed by sprayed metal being attached to said end portions of said sets of layers, respectively, of each of said capacitors, so as to connect the layers of each of said sets of layers respectively in parallel with each other; metal disc members resiliently yielding in axial direction and respectively solder to each of said contact bridge members, said metal discs of consecutive capacitors facing each other being spaced from each other except for being conductively soldered with each other along their periphery; an input terminal connected to the input end of the first of said plurality of capacitors; an output terminal connected to the output end of the last one of said plurality of capacitors; and a housing of conductive material surrounding said plurality of capacitors and insulated therefrom, said output terminal being connected to said housing.

4. A condenser as claimed in claim 3, wherein said individual disc members are provided each, in that portion which contacts the adjoining bridge member, with at least one opening for permitting said solder to extend through said opening into the area of contact between said disc member and said bridge member.

5. A condenser as claimed in claim 4, wherein said disc members are formed with a peripheral rim upturned in direction away from the particular adjoining bridge member, the inner diameter of said rim of a disc member attached to one of said capacitors being larger than the outer diameter of the disc member of the next consecutive capacitor so that rims of said disc members of consecutive capacitors are telescopingly fitted into each other, said telescopingly fitted rims being connected by solder.

6. A condenser as claimed in claim 5, wherein said disc members are formed each with an annular recess, so that the recesses of two adjoining disc members form an annular space, and an elastic ring member is fitted into said annular space for dampening elastic deformations of said disc members.

7. A condenser as claimed in claim 1, wherein the structure thereof is free of ferromagnetic materials.

8. A condenser as claimed in claim 2, wherein said layers of said sets of conductive layers are composed of vapor-deposited metal applied to said dielectric material in such a manner that each layer, except for a marginal portion thereof, is subdivided in circumferential direction into a plurality of layer portions spaced from each other.

9. A condenser as claimed in claim 2, wherein each of said conductive layers has a thickness gradually increasing from the interior of the capacitors to a maximum thickness at said end portions thereof where they are connected to said spacer means.

References Cited in the file of this patent

UNITED STATES PATENTS

| | | |
|---|---|---|
| 1,883,932 | Kazenmaier | Oct. 25, 1932 |
| 2,107,132 | Smith | Feb. 1, 1938 |

FOREIGN PATENTS

| | | |
|---|---|---|
| 722,636 | Great Britain | Jan. 26, 1955 |